(No Model.)
H. C. WOLTERECK.
PROCESS OF RECOVERING IRON FROM SCRAP.
No. 589,915. Patented Sept. 14, 1897.
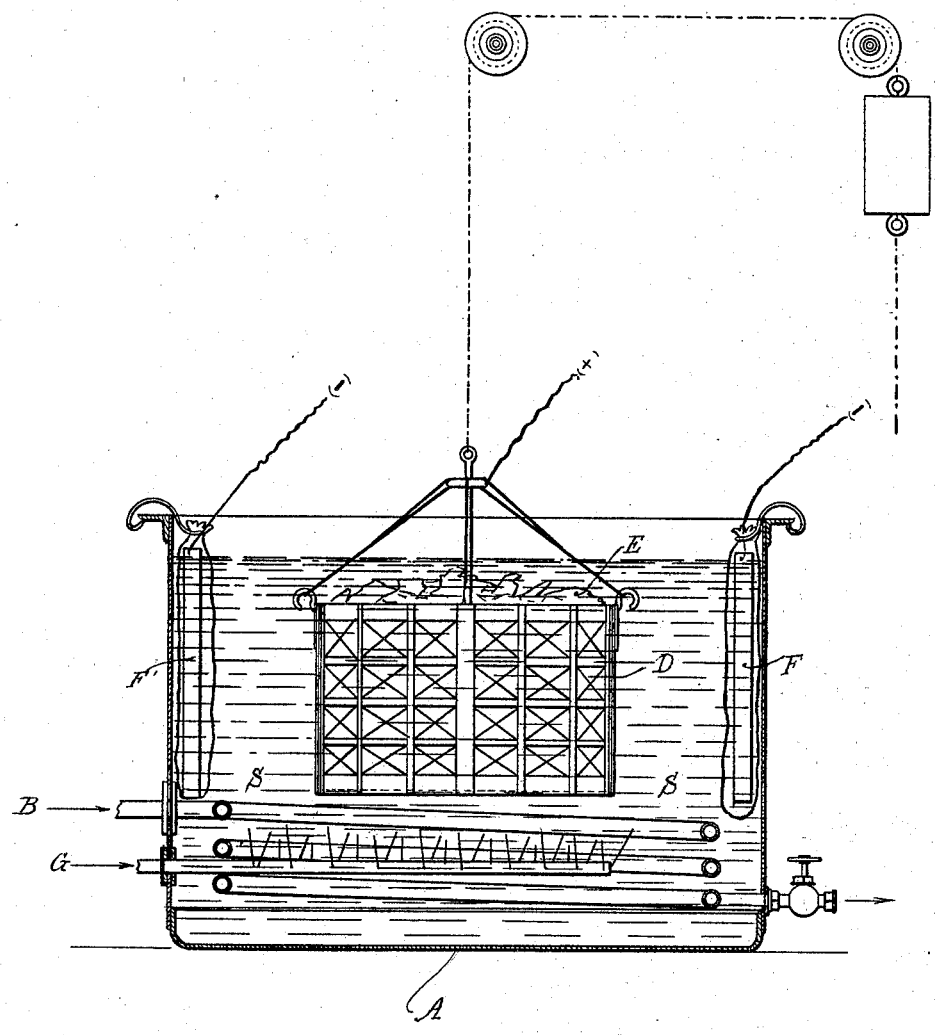
WITNESSES:
INVENTOR:

UNITED STATES PATENT OFFICE.

HERMAN C. WOLTERECK, OF NEW YORK, N. Y., ASSIGNOR TO THE ELECTRO-CHEMICAL STORAGE BATTERY CO., OF SAME PLACE.

PROCESS OF RECOVERING IRON FROM SCRAP.

SPECIFICATION forming part of Letters Patent No. 589,915, dated September 14, 1897.

Application filed November 3, 1896. Serial No. 610,952. (No specimens.)

*To all whom it may concern:*

Be it known that I, HERMAN C. WOLTERECK, a citizen of the United States, residing at New York, in the county and State of New York, have invented certain new and useful Improvements in the Process of Recovering Iron from Scrap Tin-Plate; and I hereby declare the following to be a clear, exact, and complete description of said invention, such as will enable others skilled in the art to which it appertains to apply and use the same.

My invention relates to a method of removing the tin completely from tin-plate or tin-plate scrap, thereby recovering the high-grade iron used in the manufacture thereof and allowing same to be worked over and used again in the manufacture of black plate.

It is well known that a caustic lye together with the action of the atmosphere will oxidize tin by the formation of stannic acid, which will be obtained in the form of the stannate of the alkali employed. It is also well known that tin may be recovered from a stannate solution by means of the electric current; but in the first instance the iron is oxidized or rusted and made unfit for any further use and the tin is never quite completely removed.

My invention consists in a new and improved process based on the principles of the processes mentioned, but applied in such a manner as to avoid all defects to secure a continuous process and to obtain the iron in a pure state.

The apparatus used to carry out my process is illustrated in the accompanying drawing.

In carrying out my process I take a suitable vat or tank A, provided with suitable arrangements, in this case the steam-coil B, for heating the liquid S contained therein, which consists of a strong solution of caustic soda or potash. In this solution are suspended iron baskets or cages D, which contain the tin-scrap E to be treated and which form the anode or positive pole of an electrical circuit. The cathode or negative pole is formed by a number of plates of block-tin F F', which are inclosed in canvas bags and suspended around the anode. The bath is first heated to boiling and must be kept at nearly 140° Fahrenheit during the whole operation. The reaction $$2NaOH + Sn + 2O = Na_2SnO_3 + H_2O$$

is now started by introducing a current of air at the bottom of the tank or vat through the perforated pipe G. The current is then turned on and the tin will be quickly dissolved at the anode as a stannate and deposited on the cathodes in form of a grey powder, which may be removed from time to time.

The end of the operation is easily observed at the ammeter. As the resistance decreases when all tin has been dissolved the basket containing the scrap is now removed and replaced by a new one containing fresh scrap to be treated and the same bath can practically be used continuously, care being taken to replace all water lost by evaporation. The iron-scrap from which the tin has been removed is treated further by washing in water and drying quickly, so as to avoid a subsequent rusting and is now ready for shipment.

Having thus fully described my invention, what I claim as new, and desire to secure by Letters Patent, is—

The process of recovering iron from tin-scrap which consists in placing the scrap in a heated solution of a caustic alkali, passing a current of electricity from said scrap through the solution to a suitable cathode, and simultaneously injecting into the solution a current of air.

HERMAN C. WOLTERECK.

Witnesses:
SIG. H. ROSENBLATT,
R. N. CHAMBERLAIN.